Nov. 3, 1942.    F. A. BRANDES, JR    2,300,869
ADJUSTABLE PAY-OUT REEL ASSEMBLY
Filed July 12, 1940    2 Sheets-Sheet 1
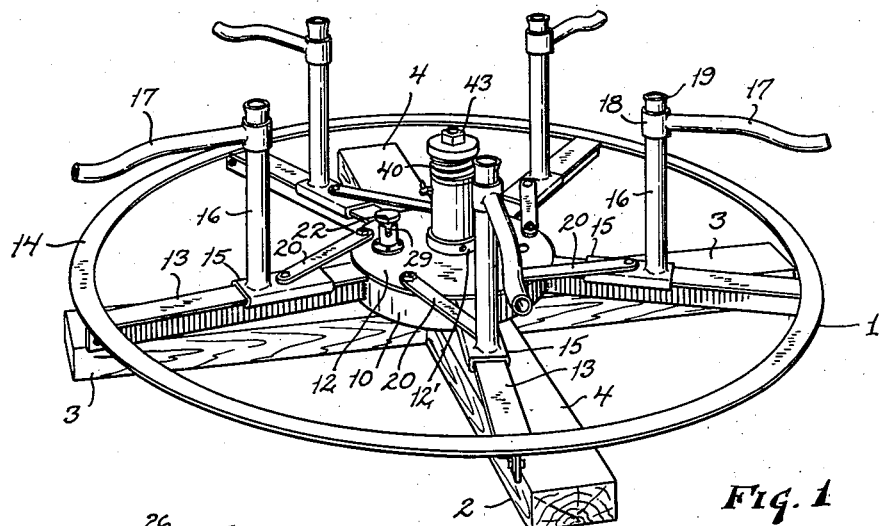
Fig. 1
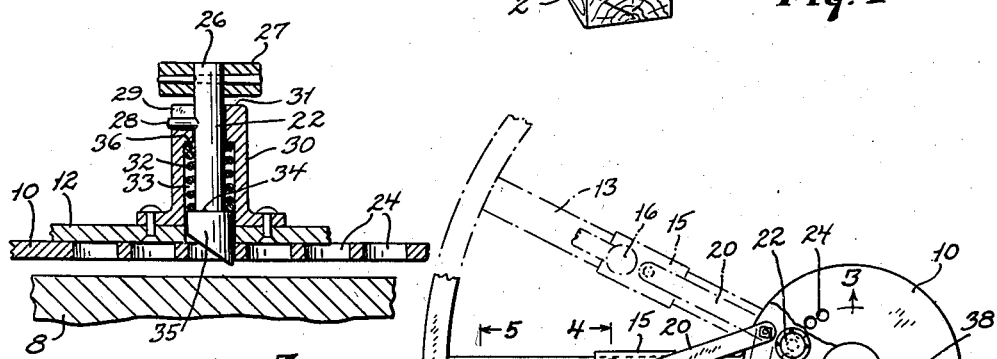
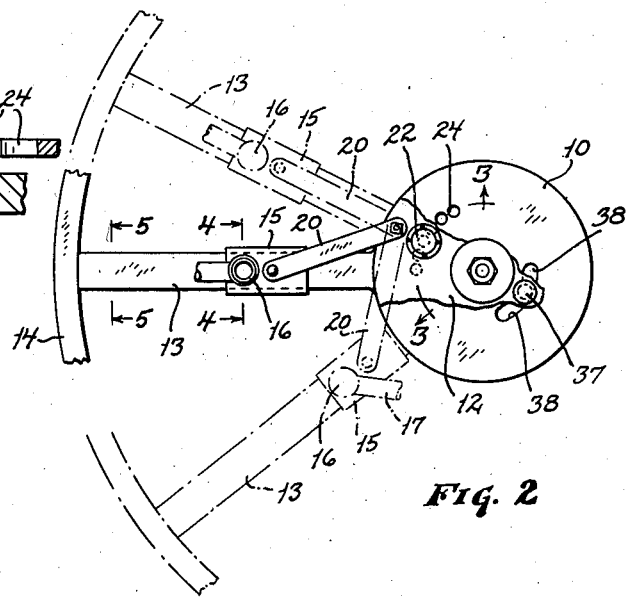
Fig. 2
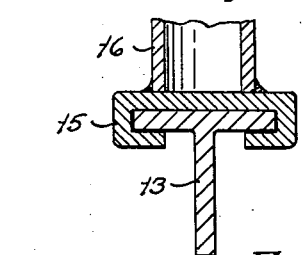
Fig. 3
Fig. 4
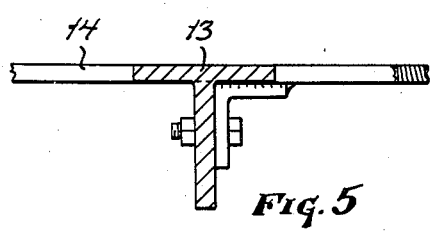
Fig. 5
INVENTOR.
Frank Albert Brandes Jr
BY Frank M. Slough
His ATTORNEY.

Nov. 3, 1942.　　　F. A. BRANDES, JR　　　2,300,869
ADJUSTABLE PAY-OUT REEL ASSEMBLY
Filed July 12, 1940　　　2 Sheets-Sheet 2

INVENTOR.
Frank Albert Brandes Jr
BY Frank M. Slough
HIS ATTORNEY

Patented Nov. 3, 1942

2,300,869

UNITED STATES PATENT OFFICE 2,300,869

ADJUSTABLE PAY-OUT REEL ASSEMBLY

Frank Albert Brandes, Jr., Columbus, Ind., assignor to The American Fork & Hoe Company, Cleveland, Ohio, a corporation of Ohio Application July 12, 1940, Serial No. 345,185

4 Claims. (Cl. 242—114)

My invention relates to certain improvements in wire pay out reels and relates more particularly to an adjustable pay out reel.

An object of my invention is to provide a wire pay out reel of the type described whereby the reel may be adjustable to accommodate different size coils of wire, etc.

Another object of my invention is to provide a wire pay out reel of the type described wherein the tension may be exerted on the reel whereby the speed at which the reel pays out may be predetermined and adjusted in use.

Another object of my invention is to provide a wire pay out reel of the type described wherein the reel may be securely mounted upon the base and prevented from undesirable play.

Another object of my invention is to provide a wire pay out reel of the type described which will be durable and compact both in use and while transporting the same.

Another object of my invention is to provide a wire pay out reel of the type described wherein the coil of wire or the like adapted to be placed thereon may be easily mounted and dismounted therefrom.

Other objects of my invention and the invention itself will become more readily apparent from a purview of the drawings attached hereto and a description of said drawings appended hereto in which drawings:

Fig. 1 is a perspective view of the pay out reel assembly;

Fig. 2 is a fragmentary view of a portion of the reel of Fig. 1 but which view shows, in dotted lines, adjusted positions which said parts may take in use;

Fig. 3 is a sectional view of the spreader plunger used in the pay out reel of my invention, which view is taken on the line 3—3 of Fig. 2;

Fig. 4 is a sectional view taken on the line 4—4 of Fig. 2;

Fig. 5 is a sectional view taken on the line 5—5 of Fig. 2;

Figure 7:
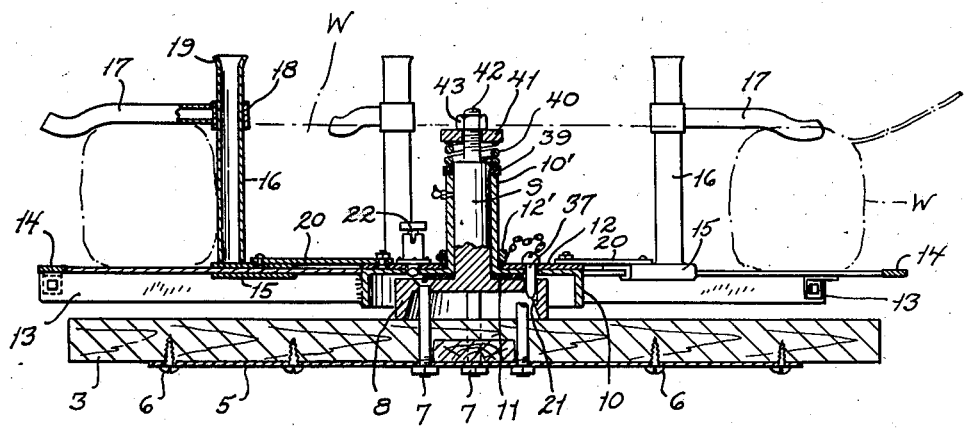
Fig. 7 is a sectional view taken on the line 7—7 of Fig. 6.

Referring to the drawings, particularly Fig. 1, the pay out reel of my invention generally shown at 1 is mounted upon a standard 2 which is formed by the jointure of a pair of cross pieces 3 and 4 secured together by a reinforcing plate 5 by means of a plurality of screws 6, as shown in Fig. 7. Said standard 2 is further bolted to the pay out reel by means of bolts 7—7 secured to a spindle 8 adapted to have mounted thereon or integrally secured thereto a center shaft 9 projected through a drum 10 encircling said spindle 8 but spaced therefrom by means of a fibre washer 11. In the form of my invention shown herein, the hollow drum 10 is provided at its inner periphery with an extended sleeve 10' integrally formed therewith, which sleeve encircles said center shaft a substantial portion of its heighth. A disk 12 overlies the drum and is free to revolve about the shaft 9 and sleeve 10' except as it may be locked to the drum or to the spindle as later described. A retaining collar 12' is secured to the sleeve 10' immediately above the disk.

A plurality of spokes, preferably five in number, indicated at 13, are secured as by welding to said drum 10 adjacent its outer periphery and at their outer free ends are joined by a circular rim 14, as shown in Fig. 5. Said spokes 13 are adapted to have mounted thereon guide members 15, each having an upright 16 extending therefrom, said upright having a curved keeper arm 17 associated therewith preferably by means of an eye 18 telescoped over the upright 16, said upright being flanged at its upper end 19 to prevent said keeper arm from being upwardly displaced therefrom.

Said guide members are each adapted to have pivoted thereto a spreader arm 20 which is pivoted at its opposite end to the disk 12 mounted above said drum; said guide member 15 is adapted to be slidably mounted on the spoke with which it is associated whereby the uprights 16 carried thereby and the keeper arms 17 associated therewith may be moved either inwardly toward the disk and drum or outwardly on said spoke toward the rim.

Figure 6:
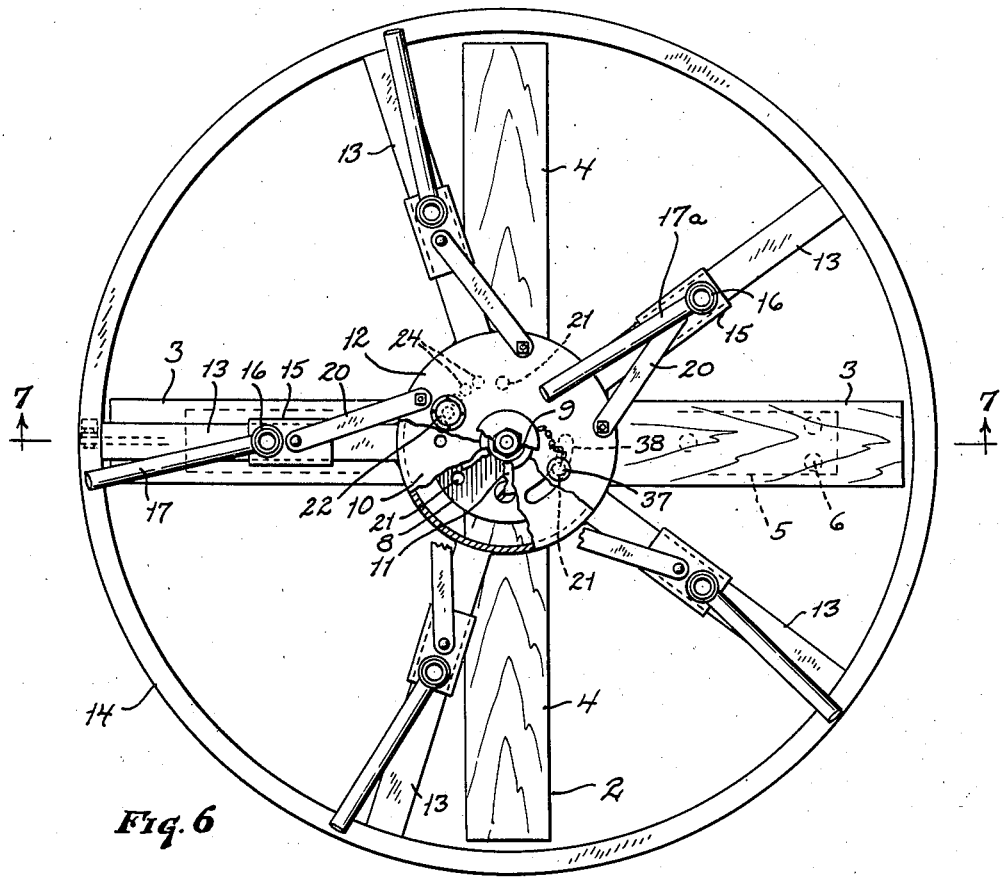
Fig. 6 is a top elevational view partly broken away to show the underlying parts of the pay out reel of my invention.

A spreader plunger 22 is adapted to be mounted upon the disk 12, projected therethrough and adapted to have seating contact within a plurality of optionally selective apertures 24 disposed in the drum 10, said apertures being, in the form shown, preferably 6 in number and being spaced from each other in an arcuate path, as shown in Figs. 2, 3 and 6 herein.

The spreader plunger 22 is preferably formed from a rod 26 having a flange collar or cap 27 thereon, the rod having a locking pin 28 associated therewith, preferably disposed at right angles to said rod, which pin is adapted to be seated within a slot 29 provided in the sleeve 30 secured to the disk 12 and supporting said rod. Upon upward pulling movement being exerted upon said collar 27 and a slight circular rotative movement of the collar, the pin is adapted to be seated upon the upper periphery 31 of said sleeve, thus disconnecting the disk and drum.

A spring 32 is placed within a spaced bore 33 formed between the sleeve and the standard, as shown in Fig. 3, and is compressed when said pin is seated upon the periphery of the sleeve. Said spring is adapted to seat at its lower end upon a shoulder 34 formed by the bevelled end portion 35 of the plunger and is adapted to seat at its upper end upon a shoulder 36 formed inwardly of the sleeve 30.

It is to be noted that the end of the plunger is bevelled only on one side thereof whereby said plunger is adapted to be slid into the adjacent apertures in one direction but locked against movement back into the adjacent apertures in the other direction.

A locking pin 37 is adapted to be dropped through an aperture in the disk 12, thence through an arcuate slot 38 provided in the drum 10 and thence into any one of a plurality of apertures 21 in the spindle base 8, thus locking the disk 12 to the standard. The slot 38 is of sufficient arcuate extent to allow the various apertures 24 in the drum to be engaged by the plunger 22.

The center shaft 9, previously referred to, is, as described, adapted to have a sleeve 10' telescoped thereover, said sleeve adapted to be either integral with the drum 10 or associated therewith. Bearing upon the upper end of said sleeve is a fibre washer 39 and upon said fibre washer 39 a spring 40 is adapted to be seated having upper seating against a collar 41 through which screw threaded means 42 having a lock nut 43 associated therewith is adapted to be projected. On tightening the lock nut 43, the spring 40 is compressed and movement of the drum is retarded; conversely upon loosening the locknut, relatively freer movement of the drum and hence the reel is had.

In operation the reel is first collapsed, that is, the cylindrical core defined by the five uprights is reduced in diameter to its lower limit, the coil retaining arms are raised to their upper limit and swung radially inward and the coil of wire W can then be lowered onto and be supported by the spokes 13. The reel is then expanded to grip the inner periphery of the coil and the arms 17 are swung outwardly and then lowered to contact the upper surface of the coil which is thus held securely. These various steps will now be described in more detail.

To collapse the reel, the plunger 22 is retracted and held out of engagement by means of the pin 28. The pin 37 is then placed in its aperture in the disk and projected through the slot 38 in the drum to rest upon the upper surface of the spindle base 8. The reel rim 14 is then turned counterclockwise turning the drum 10 rigid with it.

The drum carries the disk 12 along with it due to their frictional engagement until the pin 37 reaches one of the holes 21 in its path and drops into it, thus locking the disk to the stationary standard and arresting its rotation. The drum continues its rotation until the end of the slot 38 engages the pin 37 and is thus arrested in turn. During this latter movement, the relative positions of the disk and drum are altered and the links 20, which are pivoted at one end to the disk and at the other to the slidable guides 15 carried by spokes 13, draw the guides radially inward along the spokes.

The various parts are now, as illustrated by the lower broken line position of Fig. 2, with the guides 15 and associated uprights 16 at their extreme inner position and the right hand aperture 24 of Figs. 2 and 3 immediately below the plunger 22. The plunger is now rotated, to register the pin 28 and slot 29, and released to enter the aperture. The arms 17 are raised and swung inwardly, as shown at 17a in Fig. 6. The sleeves 18 which carry the arms have an internal diameter slightly greater than the external diameter of the uprights and in tipping, due to the weight of the arms, grip the upright to retain themselves and the arms in any adjusted position.

A coil of wire is now placed upon the reel. With the disk remaining locked to the stationary standard by means of the pin 37 the reel is now rotated clockwise, the relative motion of the disk and spokes forcing the guides 15 and uprights 16 outwardly along the spokes until the uprights engage the inner periphery of the coil. The bevelled end 35 of the plunger 22 allows it to snap from one aperture 24 to the succeeding ones but restrains the reel from reverse rotation relative to the disk and standard. At some intermediate position, illustrated in full lines in Figs. 2 and 3, or at the extreme position, illustrated in the upper broken lines of Fig. 2, the coil is gripped tightly by the uprights. This position is now retained by the plunger 22. The arms 17 are now swung outwardly and slid down to engage the top of the coil W, as illustrated in Fig. 7, the upward pressure of the coil tipping them up slightly to bind the sleeves 18 upon the uprights and locking them in place.

The standard, reel, and coil are now locked as a unit and can be conveniently transported. When it is desired to pay out the wire, the locking pin 37 is removed, freeing the disk, drum and coil to revolve as a unit about the shaft. The relative freedom of rotation is regulated, by the frictional pressure due to the spring 40, by means of the adjusting nut 43.

Although I have shown and described a preferred embodiment of my invention, I contemplate that numerous and extensive departures may be made therefrom without departing from the spirit of my invention and the scope of the appended claims.

I claim:

1. In a payout reel assembly, the combination of a standard, a reel supporting member mounted thereon, said member comprising a shaft, a drum member and an associated disc member mounted upon said shaft, a plurality of spokes rigidly secured to and extending outwardly from said drum, guide members telescoped over said spokes and movable thereon, each guide member having coil engaging means mounted thereon, spreader arms pivotally secured at their outer ends to said guide members and pivoted at their inner ends to said disc member whereby movement of said drum and said associated spokes effects movement of the spreader arms and of the guide members secured thereto, said disc member remaining in fixed relation to said shaft upon movement of the spreader arms, means adapted to secure said disc and standard in fixed position with respect to each other, said means adapted to be disengaged to permit movement when desired of the associated drum and disc members.

2. In a payout reel assembly, the combination of a standard, a reel supporting member mounted thereon, said member comprising a shaft, a drum and disc member mounted upon said shaft, a plurality of spokes rigidly secured to and extending outwardly from said drum, said spokes being joined at their free ends by a circular rim member, guide members telescoped over said spokes and movable thereon, each guide member having coil engaging means mounted thereon, spreader arms pivotally secured at their outer ends to said guide members and pivoted at their inner ends to said disc member, locking means associated with said disc and drum member whereby said coil engaging means may be maintained in their extended outward position, means adapted to secure said disc and standard in further fixed position with respect to each other whereby further movement of the disc member with respect to the standard is prevented, said securing means adapted to be disengaged to permit movement when desired of the drum and disc member, said locking means adapted to be released when the said securing means are in engaged position to permit inward movement of the guide members and their reel engaging means with respect to the drum.

3. In a payout reel assembly, the combination of a standard, a reel supporting member mounted thereon, said member comprising a shaft, a drum and disc member mounted upon said shaft, a plurality of spokes rigidly secured to and extending outwardly from said drum, said spokes being joined at their free ends by a circular rim member, guide members telescoped over said spokes and movable thereon, each guide member having an upright mounted thereon, said upright having a keeper arm telescoped thereover, said upright having means associated therewith to prevent said keeper arm from being displaced upwardly therefrom, said keeper arm having its free end of ogee form.

4. In a payout reel assembly, the combination of a standard, a reel supporting member mounted thereon, said member comprising a shaft, drum and disc members mounted upon said shaft, a plurality of spokes extending outwardly from said drum, spreader arms pivotally secured to means mounted upon said spokes and pivoted at the opposite ends to said disc member whereby upon movement of the drum said spreader arms are caused to have movement with respect to said drum, locking means associated with said disc and drum member whereby said spreader arms may be maintained in the desired position, said locking means consisting of a series of perforations provided in the drum and plunger means mounted upon said disc, said plunger means having means associated therewith provided with a bevelled end portion adapted to be projected into any of said perforations in order to maintain the spreader arms in any preferred position on said reel assembly, said plunger means being so formed as to successively engage succeeding perforations in the drum but prevented by its form from re-entry into any previously entered perforation, securing means adapted to secure said disc, drum and standard in fixed position with respect to each other whereby further movement of the drum or disc members with respect to the standard is limited, said securing means consisting of an arcuate slot in said drum member and pin means mounted upon said disc, said pin means being adapted to enter said arcuate slot formed in said drum, the extent of said arcuate slot being such as to permit movement of the locking means through the successive perforations provided in the drum when said disc and standard are secured together.

FRANK ALBERT BRANDES, Jr.